Figure 2:
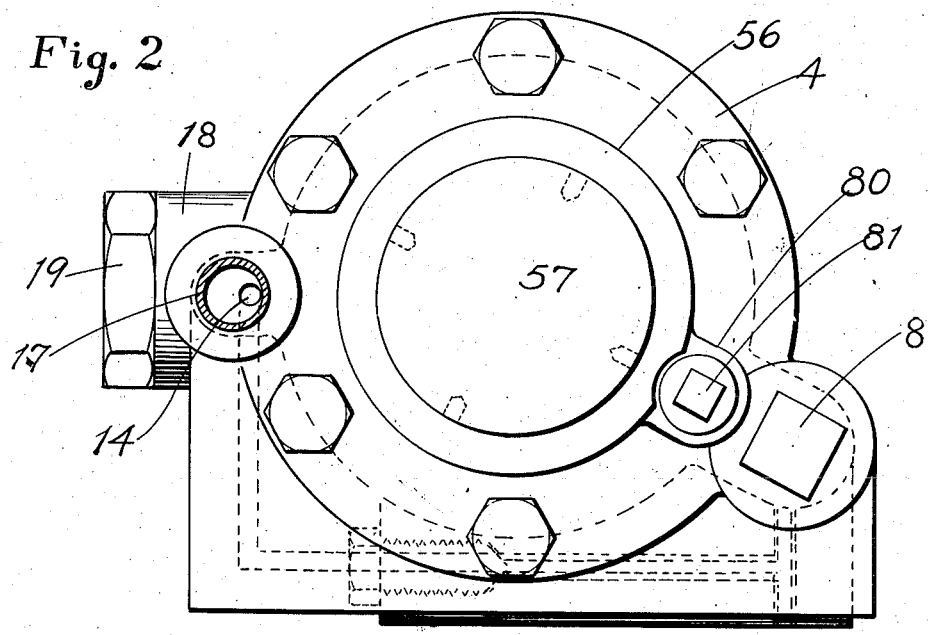

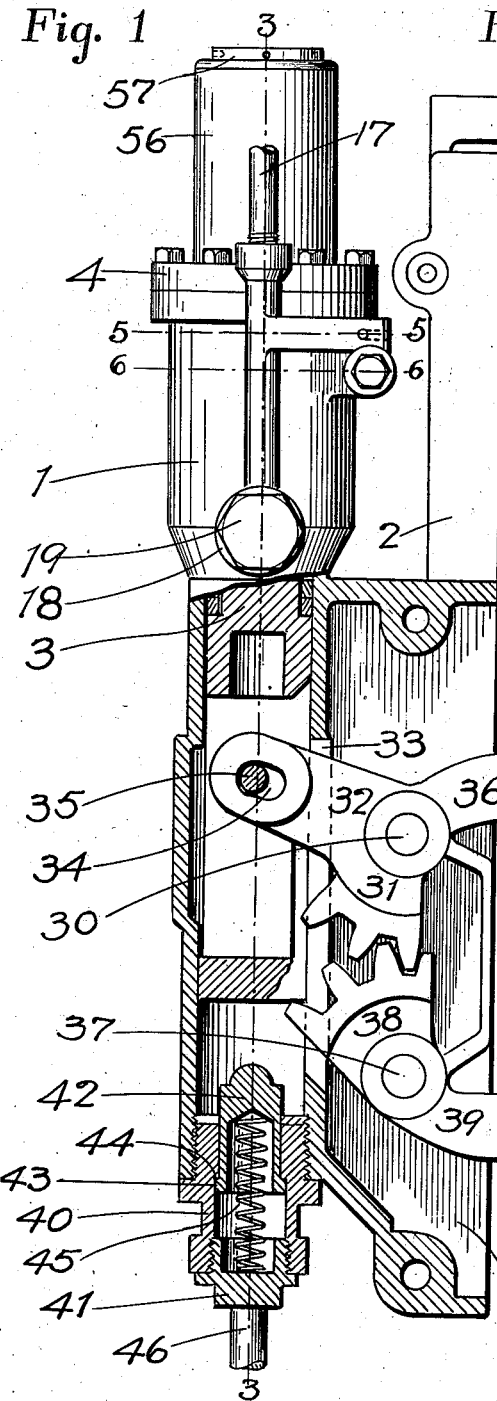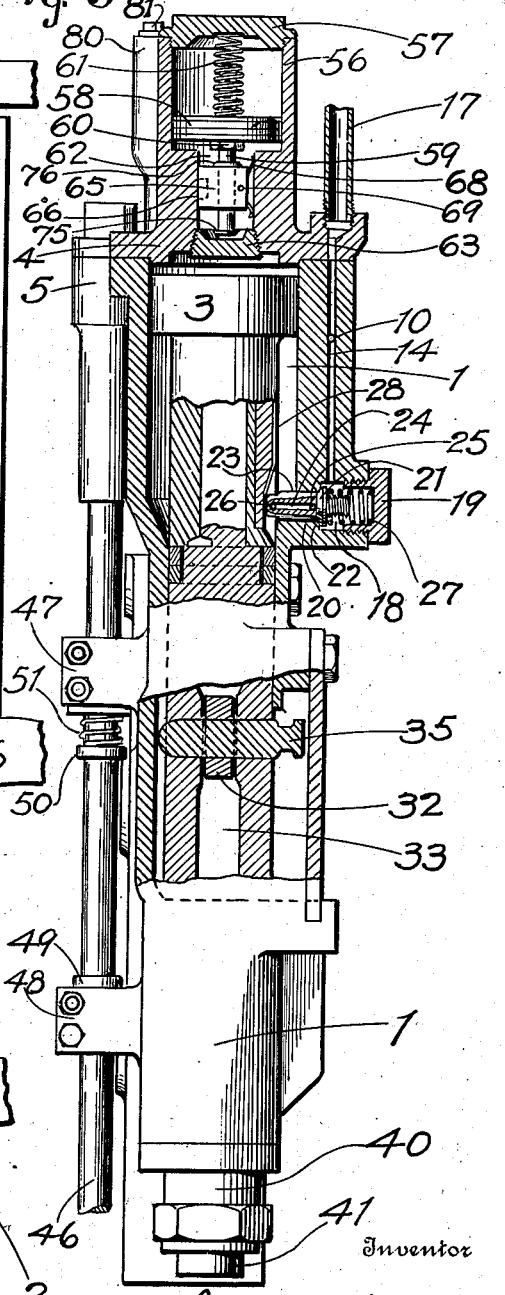

G. AKANS.
FLUID ACTUATED MOTOR.
APPLICATION FILED MAY 10, 1915. RENEWED MAR. 23, 1916.

1,194,346.

Patented Aug. 15, 1916.
8 SHEETS—SHEET 2.

Inventor
George Akans
By Cyrus Kehr
Attorney

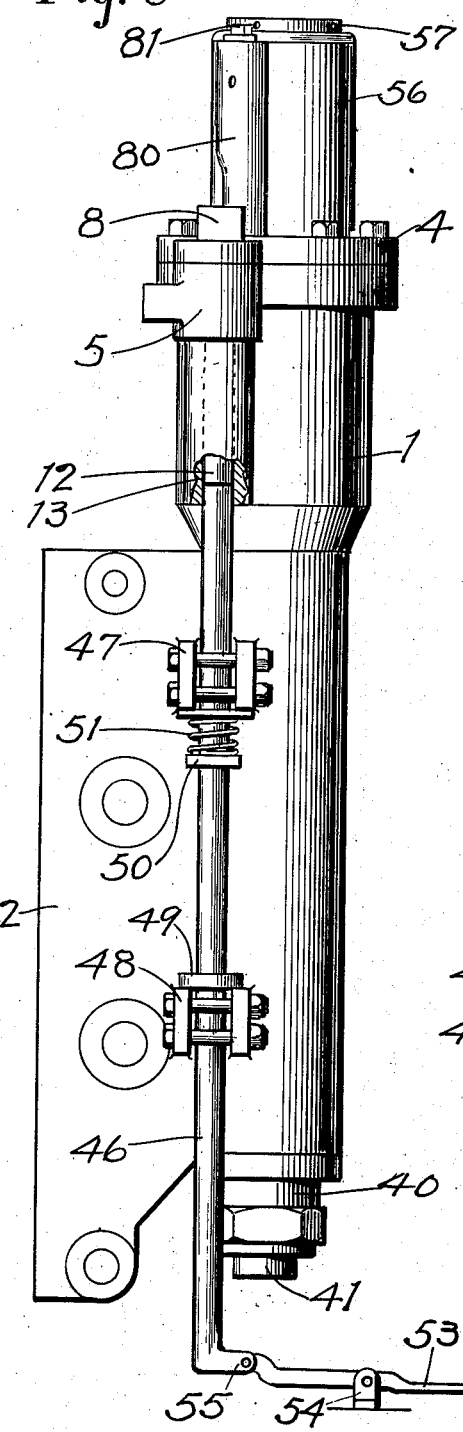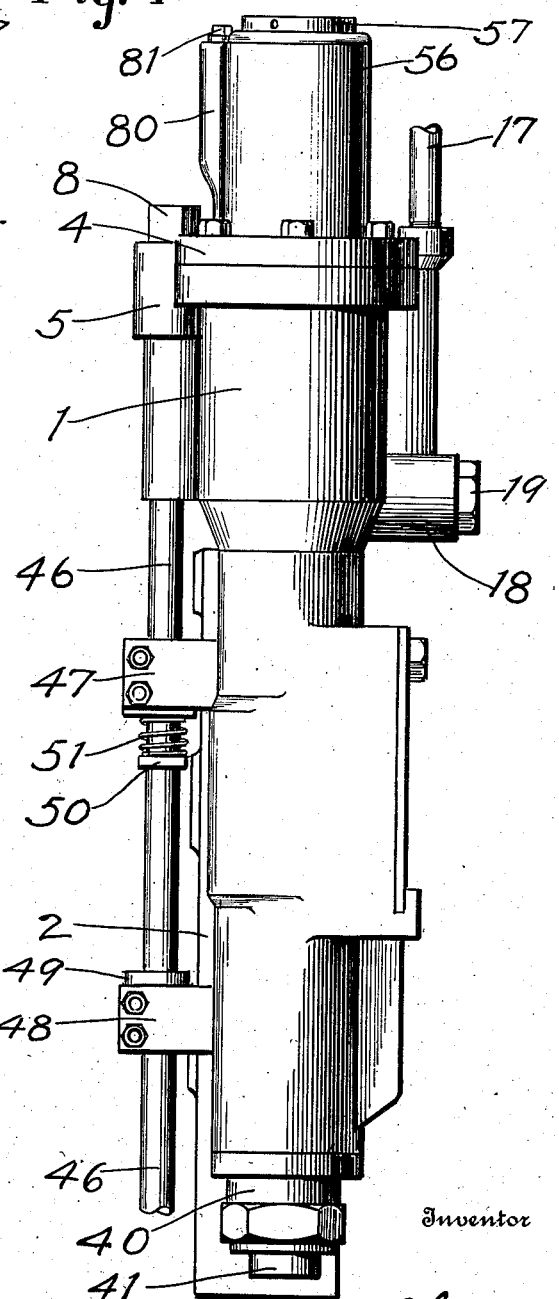

G. AKANS.
FLUID ACTUATED MOTOR.
APPLICATION FILED MAY 10, 1915. RENEWED MAR. 23, 1916.

1,194,346.

Patented Aug. 15, 1916.
8 SHEETS—SHEET 4.

Inventor
George Akans
By Cyrus Kehr
Attorney

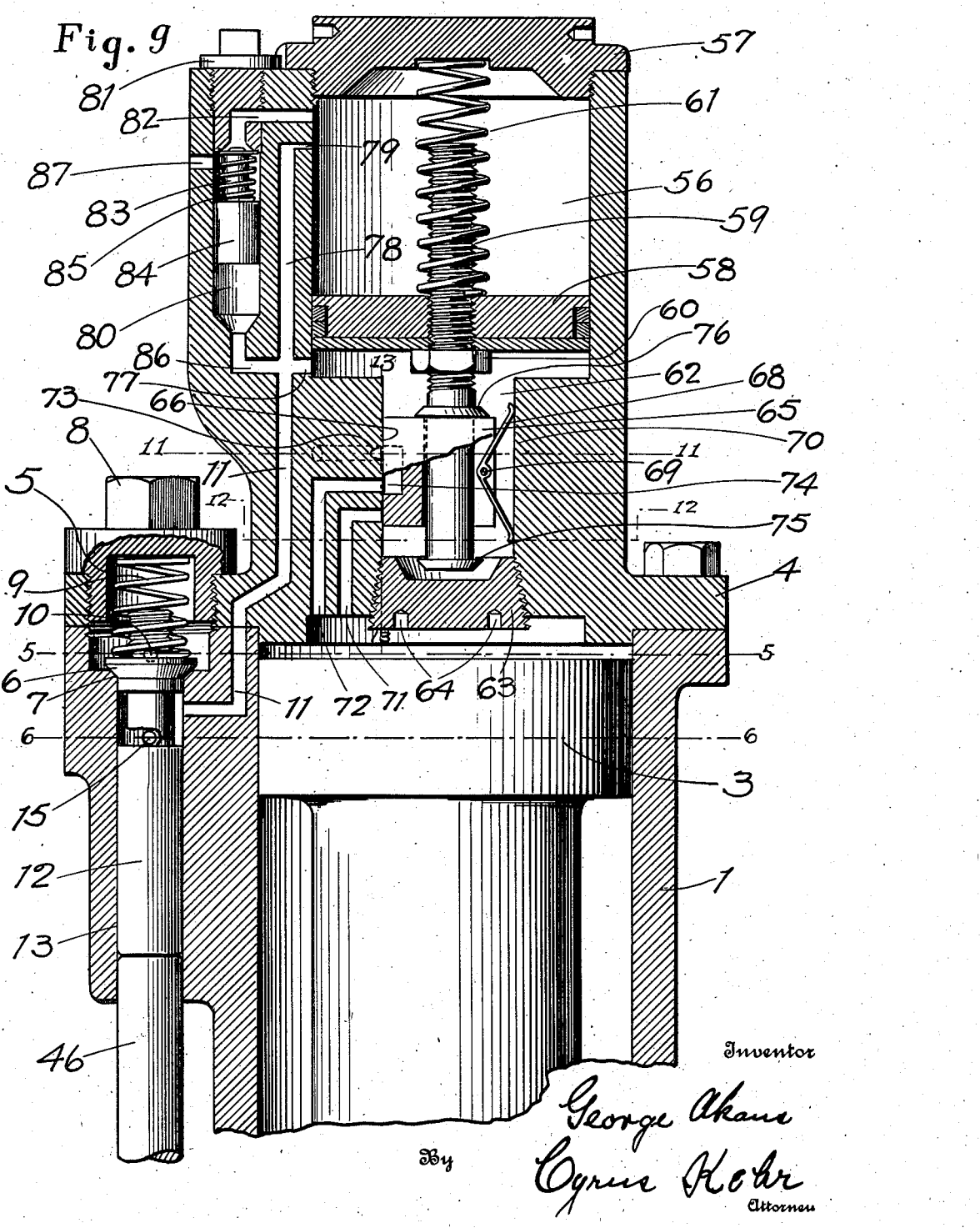

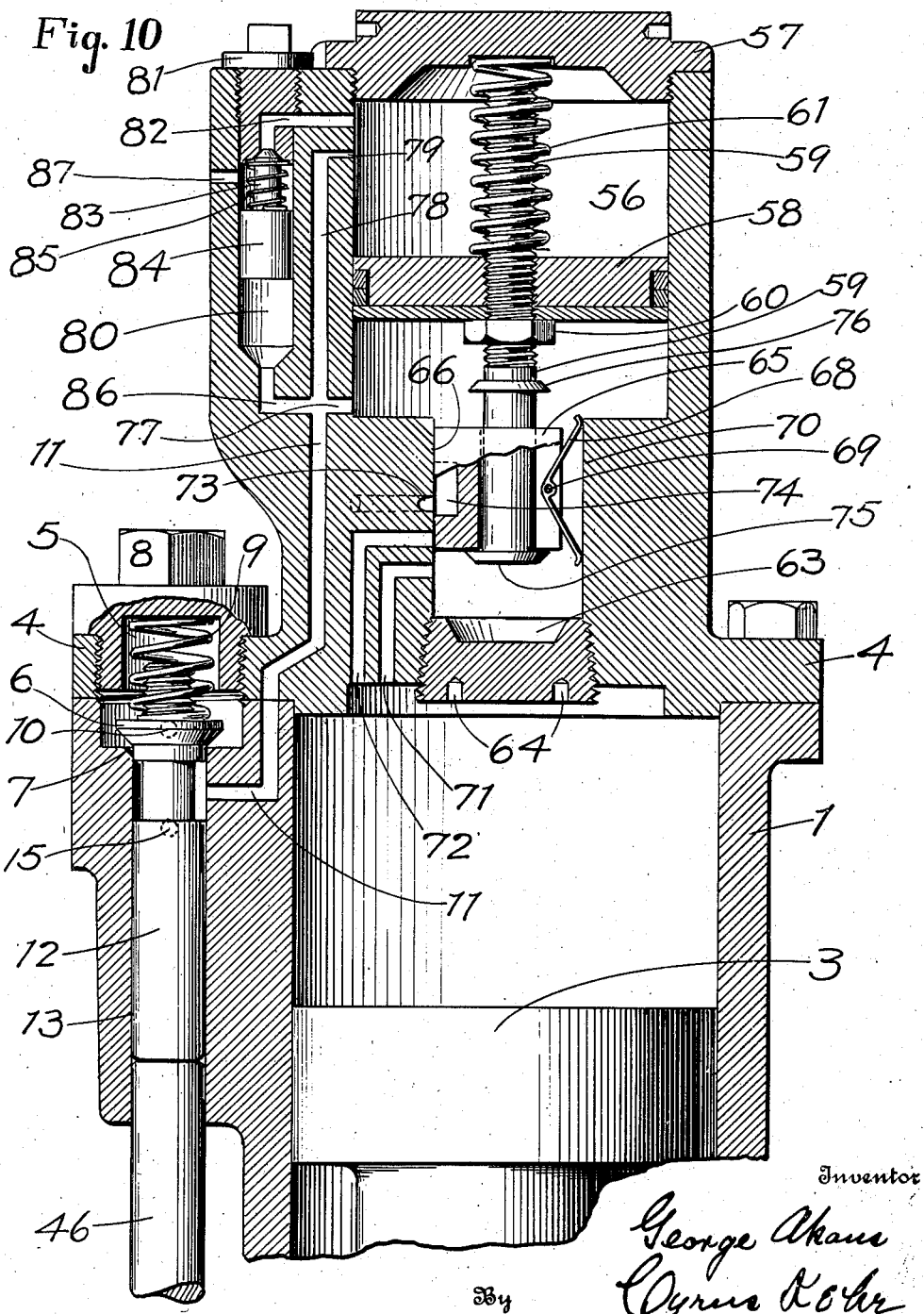

G. AKANS.
FLUID ACTUATED MOTOR.
APPLICATION FILED MAY 10, 1915. RENEWED MAR. 23, 1916.
1,194,346.
Patented Aug. 15, 1916.
8 SHEETS—SHEET 7.
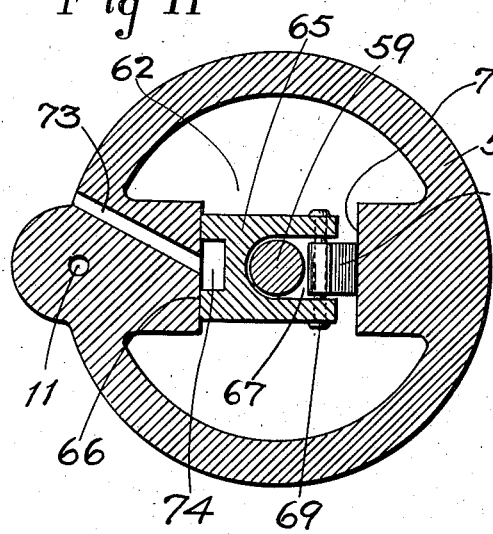
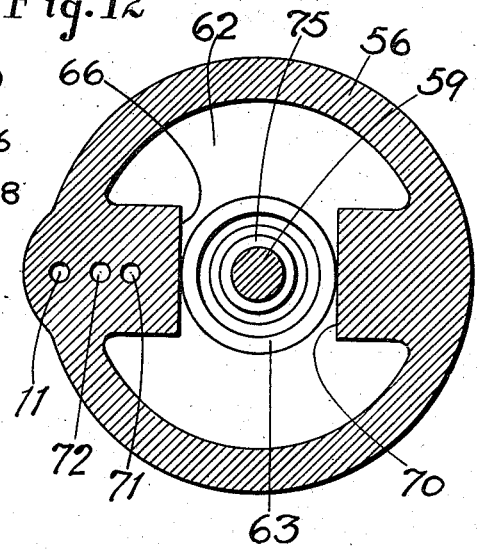
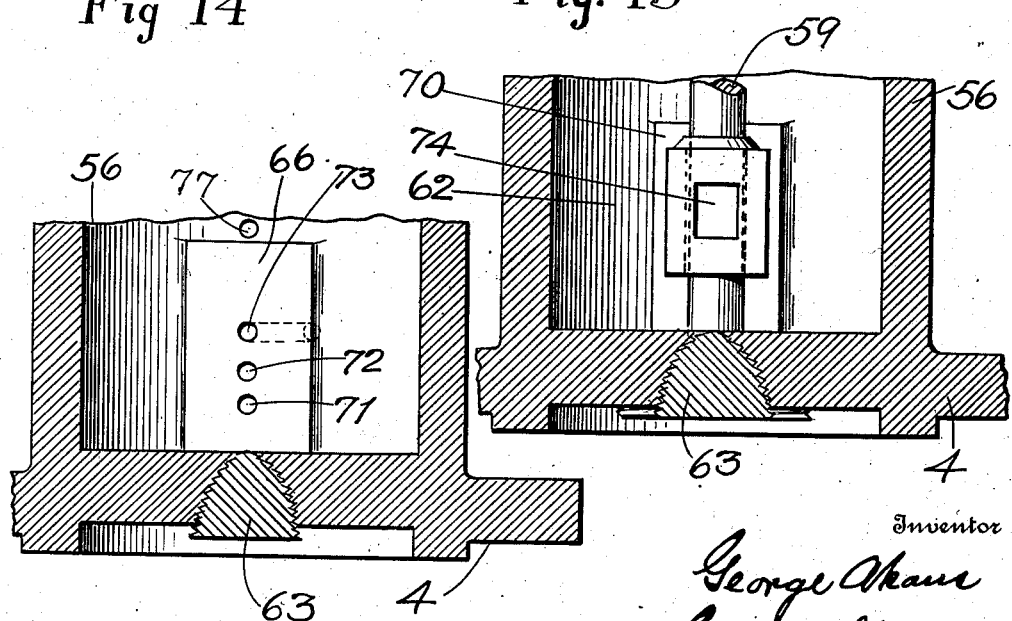

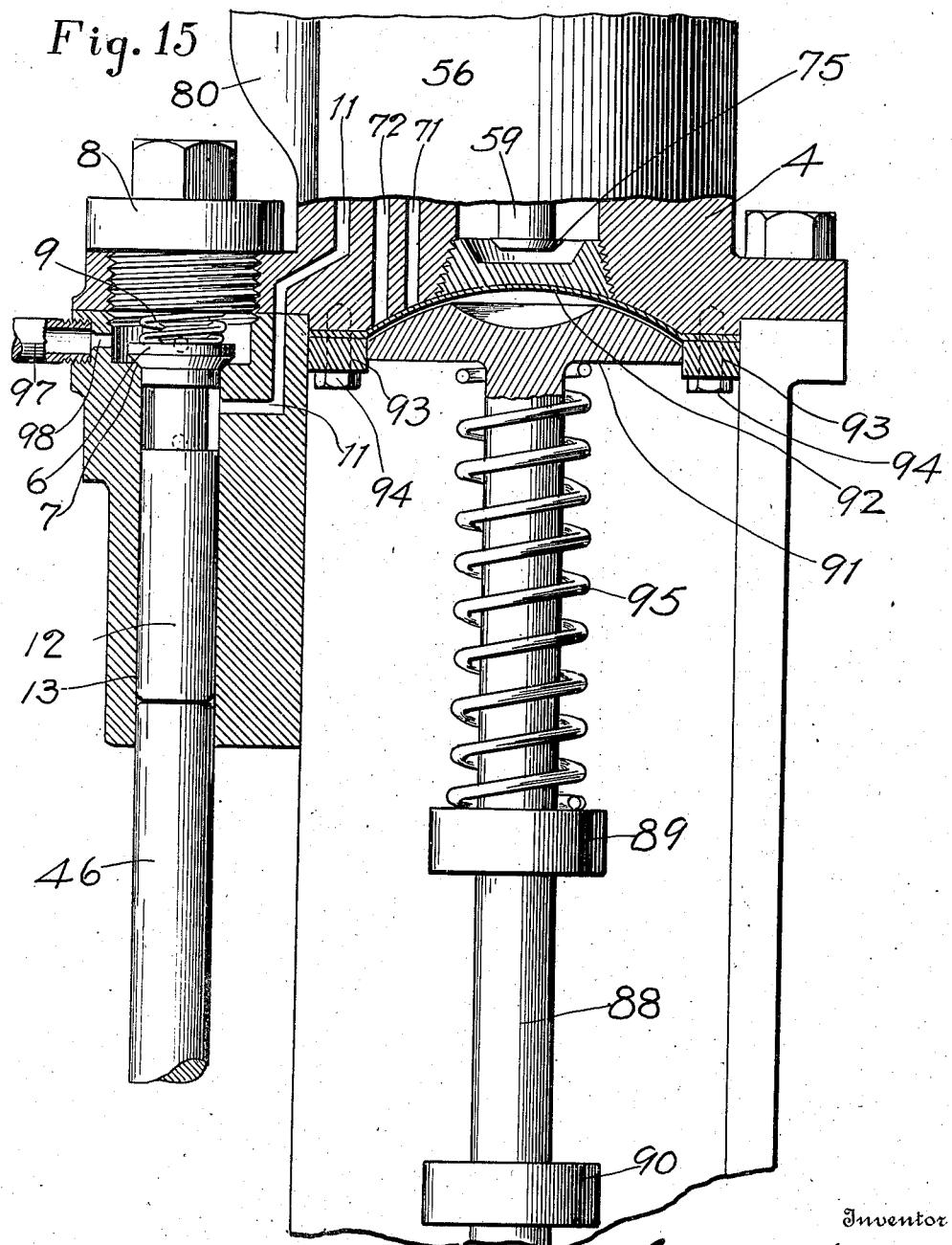

UNITED STATES PATENT OFFICE.

GEORGE AKANS, OF ATLANTA, GEORGIA, ASSIGNOR TO WILLIAM S. MURRIAN, TRUSTEE, OF KNOXVILLE, TENNESSEE.

FLUID-ACTUATED MOTOR.

1,194,346.  Specification of Letters Patent.  Patented Aug. 15, 1916.

Application filed May 10, 1915, Serial No. 27,169. Renewed March 23, 1916. Serial No. 86,281.

*To all whom it may concern:*

Be it known that I, GEORGE AKANS, a citizen of the United States, residing at Atlanta, in the county of Fulton and State of Georgia, have invented a new and useful Improvement in Fluid-Actuated Motors, of which the following is a specification, reference being had to the accompanying drawing.

My improvement relates particularly to fluid-actuated motors comprising an expansion chamber which contains a piston or a similar reciprocatory member driven by fluid under pressure, the admission of such fluid for actuating the piston or similar member being under the control of an operator or of mechanism associated with the motor.

The object of my invention is to embody in the motor automatic fluid-actuated means for limiting the duration of the action of the fluid upon the piston or similar member after the operator or such associated mechanism has moved a member for establishing admission of fluid under pressure for moving said piston or similar member from its position of rest.

As an example of use for such a motor, I mention the control of locomotive and other steam-boiler fire-box doors, the pressure fluid used, being, usually, air, and the main piston of the motor being in its position of rest when the doors are closed, and the piston being driven from its position of rest for the opening of the doors, and the valve by which air is admitted for driving the piston from its position of rest being opened by pressure of the foot of the fireman upon a pedal which is connected with transmission members leading to said valve.

My improved motor comprises means for automatically cutting off the supply of air to the expansion chamber and releasing the fluid from the expansion chamber after the main or admission valve has been open a chosen time, even if said valve remains open; to the end that the doors may remain open only during a chosen period of time, although the fireman prolongs the pressure upon the pedal.

The various parts are to be so proportioned and adjusted as to cause the doors to be opened just long enough to allow the fireman to deliver a shovel full of coal through the door into the firebox. By limiting the period during which the door is open, the quantity of cold air rushing into the firebox through the door is limited. As is known to those familiar with this art, the admission of an excessive quantity of cold air into the firebox of a steam boiler chills the fire and inner portions of the boiler, including flues; and such chilling interferes with combustion of fuel and reduces the production of steam and injures the flues and other portions of the boiler. Furthermore, such control of the door prevents the fireman from feeding coal in excessive quantities at any one time. He is obliged to feed evenly during the time he is on duty. This leads to more complete and uniform combustion of the coal and tends to avoid wasting fuel and making smoke.

It is to be noted that when such doors are thus operated, it is desirable that both the opening and closing movements be relatively rapid, in order that the doors may remain closed as long a time as possible.

The portion of the motor which comprises the above-mentioned piston or similar member may be of any desired form. This portion, as shown and described in this application, is already known in the art and has been used for the control of steam boiler firebox doors.

Figure 5:
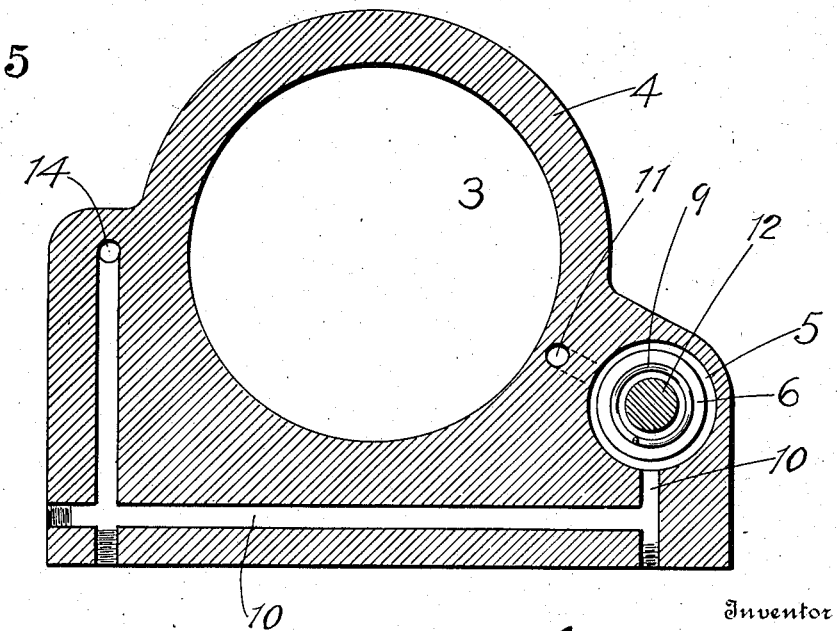
Figure 6:
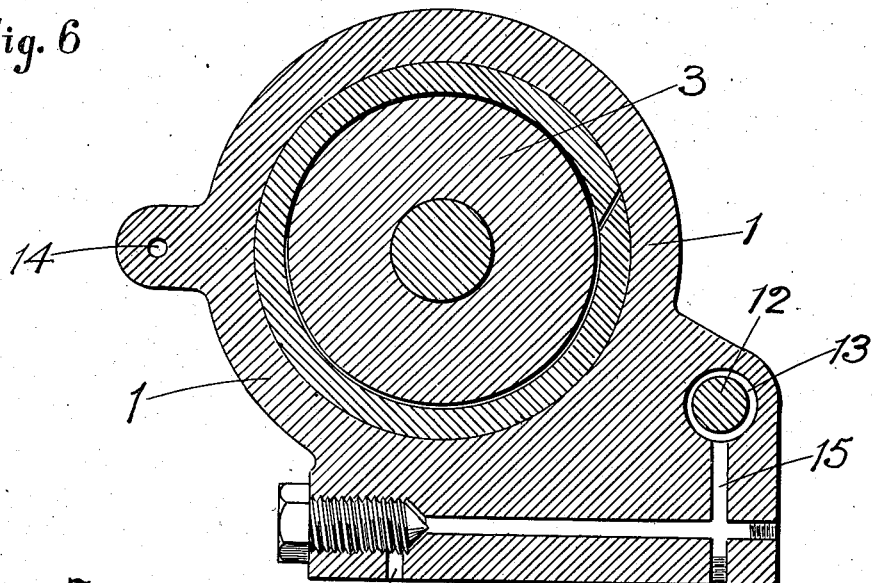
Figure 7:
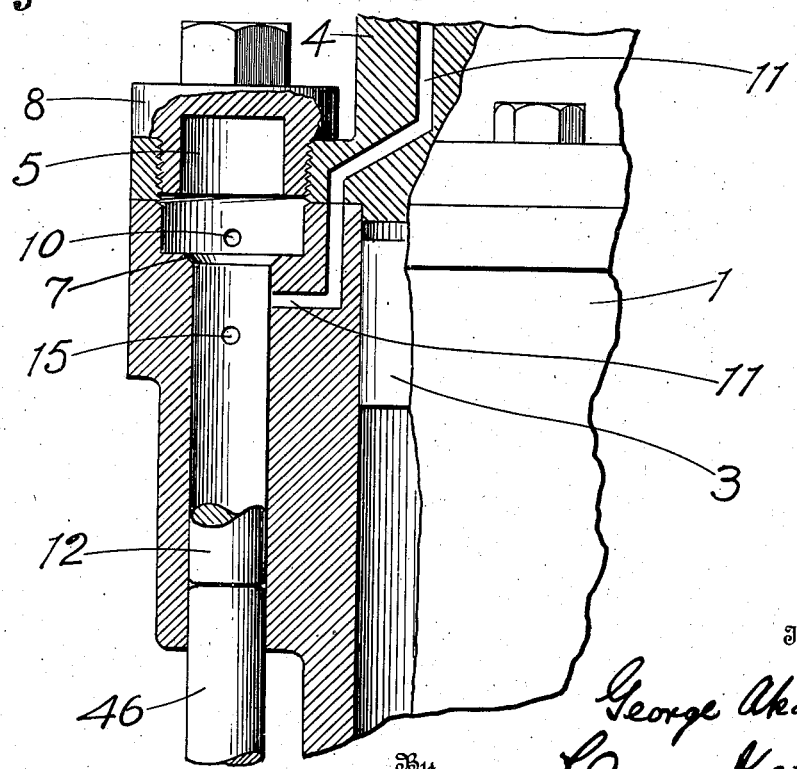

In the accompanying drawings, Figure 1 is a front view, partially in section, of a structure embodying my improvement; Fig. 2 is a top view; Fig. 3 is a partial section on the line, 3—3, of Fig. 1; Fig. 4 is a side view looking at the apparatus from the left as shown in Fig. 1; Fig. 5 is an enlarged section on the line, 5—5, of Figs. 1 and 9; Fig. 6 is an enlarged section on the line, 6—6, of Figs. 1 and 9; Fig. 7 is an enlarged fragmentary section of the main valve chamber; Fig. 8 is a rear elevation, portions being broken away; Fig. 9 is an enlarged upright section of the upper portion of the apparatus, all the parts being in their rest positions; Fig. 10 is the same section with the parts set for driving air into the upper portion of the main cylinder; Fig. 11 is a section on the line, 11—11, of Fig. 9; Fig. 12 is a section on the line, 12—12, of Fig. 9; Fig. 13 is a section on the line, 13—13, of Fig. 9, looking toward the right; Fig. 14 is a section on the same line, looking toward the left; Fig. 15 is a sectional elevation of a motor embodying my invention and comprising a flexible diaphragm.

The main cylinder, 1, is shown upright and as having a plate, 2, by means of which the cylinder may be secured to any other structure. In the cylinder is the main piston, 3, which is in its position of rest when it is close to the head, 4, of the cylinder. The piston is to be driven downward by air entering the cylinder above the piston.

In the main valve chamber, 5, is a main valve, 6, adapted to rest on a seat, 7. The upper portion of said chamber is formed by a cap, 8, which is screwed into the adjacent portion of the cylinder. Within said cap is an expanding coiled spring, 9, bearing downward upon the valve and normally holding the latter against the seat, 7. Air is admitted to said chamber through the port, 10. Below the valve seat, a port on passage, 11, extends upward through the cylinder wall and into the head, 4. A stem, 12, extends downward through a passage, 13. Immediately below the valve, said stem is of smaller diameter than said passage, whereby space is left around the stem within said passage. Below said contracted portion, said stem is made of the full diameter of said passage so as to prevent downward flow of air through said passage. An exhaust port, 15, leads from the valve stem passage, 13, to the outside exhaust port, 16. A supply pipe, 17, containing air under pressure is screw-threaded into the base flange of the cylinder head, 4, in communication with the port, 14. The lower portion of said port opens into a valve chamber, 18, the outer portion of which is formed by a cap, 19, which is screw-threaded into the side wall of the cylinder. In horizontal alinement with said chamber is a horizontal passage, 20. A valve, 21, is located within said chamber, 18, and bears normally against a seat, 22, and has a stem, 23, resting in said passage and extending into the interior of the cylinder. Next to the valve, said stem is contracted so as to form an open space around said stem within said passage. Said stem has a passage or duct, 24, along its axis, and next to the valve a duct, 25, intersects said duct, 24, and within the cylinder, a transverse duct, 26, intersects the axial duct, 24. An expanding coiled spring, 27, is located within the chamber, 18, and bears endwise against the cap, 19, and against the valve, 21, for normally pressing said valve to its seat.

Below the valve, 21, and at its stem, 23, the interior diameter of the cylinder, 1, is contracted to conform to the diameter of the neck or stem of the piston, whereby the stem is held to linear movement. The neck of the piston has a cam, 28, opposite the valve stem, 23, the lower portion of said cam permitting the valve, 21, to seat when the piston is in its upper or rest position. The portion of said cam which is above said stem when the piston is in its upper position extends outward toward the cylinder wall, so that when the piston is driven downward, said cam will push said stem outward and unseat the valve, 21. While the head is descending, the valve, 21, is open, so that air is driven out through that valve and up through the port, 14, into the supply pipe, 17, and through the duct, 10, into the space above the piston.

The piston is differential, because the area of its lower face is less than the area on the upper face, the difference being the cross-sectional area of the piston neck. Hence the piston is driven downward when the main valve, 6, and the valve, 21, are both open.

When the valve stem, 12, is pushed upward by pressure on the pedal hereinafter described, the main valve, 6, is raised so that air may flow from the valve chamber, 5, downward into the passage, 13, and thence upward through the port, 11, and thence, by a course hereinafter described, into the interior of the main cylinder above the piston head. By this means, this piston is started downward, the valve, 21, being at the time closed. Soon the cam, 28, forces the stem, 23, and the valve, 21, outward, so that air under pressure may communicate downward through the port, 14, the chamber, 18, and the valve, 21, and the stem, 23, into the interior of the cylinder below the piston head. The pressure of this air is the same as the air passing through the port, 10, into the upper portion of the cylinder; but since the piston is a differential piston, as above stated, the downward pressure overcomes the upward pressure, and the piston continues to move downward until it reaches its lower limit. During such descent of the piston, the air bearing against the piston from below is driven outward through the valve chamber, 18, slowly, and, before it is thus expelled, it serves as a cushion or retarding medium to avoid such rapid movement as would cause jarring or slamming of the firebox doors or other part or parts connected with the piston to be operated by the latter.

When the main valve stem, 12, is pushed upward for opening the main valve, the portion of said stem which is of full diameter extends across the exhaust port, 15, so that air can not pass outward through said port to the atmosphere. When the main valve stem is again released and allowed to descend through the action of the coiled spring, 9, said valve returns to its seat.

It will be observed that the cam, 28, is so arranged that the valve, 21, closes when the piston reaches its upper limit, pressure being then cut off from both sides of the piston.

On the plate, 2, is a journal, 30, which supports a segment gear, 31, on which is an arm, 32, which extends into a slot, 33, in the piston stem and has a slot, 34, which receives a pin, 35, which is seated in the piston stem. From said segment gear, an arm, 36, extends outward horizontally away from the cylinder. A journal, 37, is supported by the plate, 2, below the journal, 30, and said journal, 37, supports a segment gear, 38, meshing with the segment gear, 31. On the segment gear, 38, is an arm, 39, extending away from the cylinder parallel to the arm, 36. When the piston is driven downward, the arm, 32, is driven downward and the segment gear, 31, rotated to lift the arm, 36, and the segment gear, 31, turns the segment gear, 38, upward to move the arm, 39, downward. Said arms may support firebox doors (not shown) or any other members.

A tube, 40, is screw-threaded into the lower end of the cylinder. A cap, 41, is screw-threaded into the lower end of said tube. A hollow cushion block, 42, rests slidably in the upper portion of the tube, 40, and projects upward out of said tube into the interior of the cylinder. The lower end of said block has a head, 43, adapted to bear upward against the shoulder, 44, in the tube, 40, said shoulder limiting the upward movement of said cushion block. An expanding coiled spring, 45, is located within the block, 42, the tube, 40, and the cap, 41, and normally presses said block upward to its upper limit. When the piston stem moves downward far enough to bear against the upper end of said cushion block, the latter bears yieldingly against the piston, and the downward movement of the piston is thus gradually arrested.

The upper end of the valve bar, 46, normally rests just below and in approximate alinement with the lower end of the valve stem, 12, so that when said bar is pushed upward it will abut against the lower end of said stem and push the latter upward. Said bar is slidable in an upper bearing, 47, and a lower bearing, 48. The downward movement of said bar is limited by a collar, 49, fixed on said bar above the lower bearing, 48, and adapted to rest on said bearing. Below the upper bearing, 47, an annular shoulder, 50, surrounds said bar, and an expanding coiled spring, 51, surrounds said bar, between said shoulder and said bearing and normally exerts such pressure against said bearing and said shoulder as will cause the bar to move downward until the collar, 49, rests on the bearing, 48. The collar, 49, should be so placed as to bring the upper end of the valve bar a little below the lower end of the valve stem when the valve is seated. A pedal, 53, is fulcrumed on a support, 54, and has one end hinged to the lower end of the valve bar at 55.

The head, 4, is extended upward and comprises in said extended portion an auxiliary cylinder, 56, within which is a piston, 58, on a stem, 59. The upper end of said cylinder is closed by a cap, 57, screw-threaded into said cylinder. The piston is screw-threaded on the stem, and a jam-nut, 60, surrounds the stem at one side of the piston and is adapted to bind against the piston to secure the latter immovably on the stem. When said nut has been loosened, the piston may be turned on the shaft to move it endwise on the shaft. An expanding coiled spring, 61, surrounds said stem between said cap and the piston and constantly presses downward on the piston. Below said cylinder is a smaller chamber, 62, connecting with the cylinder and surrounding the lower end of the stem, 59. Below said chamber is a screw-plug, 63, seated in the head, 4. In the lower face of said plug are wrench sockets, 64, by which a wrench may engage said plug. Within the chamber, 62, is an upright slide-valve, 65, set to slide against an upright face, 66. Said valve has a recess, 67, extending into the valve from the side of the latter which is the farther from the face, 66, and the stem, 59, extends through said recess. In said recess is a V-shape spring, 68, having its ends reaching out against a face, 70, constituting one of the upper walls of the chamber, 62. Said spring is held in place by a pin, 69, extending horizontally through the slide-valve, 65, and said spring. These parts are so adjusted as to cause the spring to press the slide-valve yieldingly against the face, 66. Relative to the valve, 6, the valve, 65, is an auxiliary valve.

Three ports or passages, 71, 72, and 73, open through the face, 66, into the chamber, 62. The port, 71, has the lowest opening through the face, 66, and opens downward into the main cylinder. The port, 72, has the next highest opening through the face, 66, and also extends downward into the main cylinder. The port, 73, opens through the face, 66, a little higher and also opens to the atmosphere. The slide-valve has a cavity, 74, which is opposite the ports, 72, and 73, when the slide-valve is at its lower limit, thus forming communication from the upper portion of the main cylinder through the port, 72, said cavity, 74, and the port, 73, to the atmosphere. While the slide-valve is in this position, the portion of said valve below the cavity, 74, covers the port, 71, so as to cut off communication between the upper portion of the main cylinder and the lower portion of the auxiliary cylinder, 56.

When the slide-valve is at its upper limit, the port, 71, is uncovered and the port, 72, is covered, whereby communication between the upper portion of the main cylinder and the lower portion of the cylinder, 56, is established. The frictional engagement between the spring, 68, and the wall of the chamber, 62, and between the slide-valve and the face, 66, renders the slide-valve slidable up and down, but tends to hold the slide-valve at rest. On the lower end of the stem, 59, is a stop, 75, which bears against the lower face of the slide-valve when the piston is at its upper limit. The said parts are so adjusted as to produce said engagement when the piston is at its upper limit. A similar stop, 76, is carried by the stem, 59, at the proper height above the slide-valve to drive the slide-valve to its lower limit by the time the stem reaches its lower limit. The distance between the stops, 75 and 76, is greater than the height of the slide-valve, so that the stem may move a chosen distance while the slide-valve remains at rest.

The upper portion of the duct, 11, opens into the auxiliary cylinder, 56, through a port, 77, between the piston and the portion of the wall of the head, 4, which bears the face, 66.

From the upper portion of the port, 11, a duct or passage, 78, leads upward and communicates with the upper portion of the cylinder, above the auxiliary piston, 58, through a port, 79, which is smaller than the port, 77.

In the upper portion of the side wall of the auxiliary cylinder is an upright valve chamber, 80. The upper portion of said chamber is covered by a screw plug, 81. A port, 82, extends from the interior of the auxiliary cylinder outward into said plug and then downward through said plug. The lower portion of said port forms a valve seat for a stem-form valve member, 83, which extends upward from a piston, 84, which fits slidably into the chamber, 80. An expanding coiled spring, 85, surrounds said stem and bears upward against the plug, 81, and downward against the piston, 84, and constantly tends to drive said piston and said stem downward to open the port, 82. From the upper end of the duct, 11, a duct, 86, extends laterally and then upward into the chamber, 80. From the portion of the chamber, 80, above the piston, 84, a port, 87, leads through the outer wall of said chamber to the atmosphere.

The operation, briefly stated, is as follows: The passage, 10, (Fig. 9), valve chamber, 5, duct, 11, port, 77, chamber, 62, and duct, 71, constitute a passage from a source of fluid under pressure into the main expansion chamber wherein the main or working piston is located and is to be driven downward for doing work. The main valve, 6, normally cuts said passage off. The auxiliary valve, 65, is located on said passage between the main valve and the main expansion chamber and also normally cuts said passage off. The auxiliary valve is movable with the auxiliary piston, 58. Opening the main valve by raising the valve bar, 46, allows flow of air past the main valve and to the lower side of the auxiliary piston, 58, whereby said piston is raised and the auxiliary valve lifted by said piston to open said passage. Now air enters the main expansion chamber through the duct, 71, and drives the main piston 3, downward. But, while the air passes rapidly through the port, 77, below the piston, 58, it passes slowly through the small port, 79, above said piston, and soon the pressures above and below the piston, 58, become equalized and the spring, 61, drives said piston downward, whereby the auxiliary valve, 65, is driven downward to again cut off said passage and simultaneously open an exhaust port communicating with the upper portion of the main expansion chamber. The air pressing upward on the main piston now drives said piston upward into its upper or rest position.

In detail said operation is as follows: It will be observed that when the entire apparatus is at rest, the piston in the main cylinder is in its upper position, the main valve is closed, the slide-valve, 65, is in its lowermost position, whereby it covers the upper end of the duct, 71, and puts the ducts, 72 and 73, into register with the cavity, 74, in the slide-valve, 65, so that communication between the interior of the auxiliary cylinder and the interior of the main cylinder is cut off and there is communication from the interior of the main cylinder through the duct, 72, the recess, 74, and the duct, 73, to the atmosphere. At the same time, the valve, 83, is open, so that there is communication from the upper portion of the interior of the cylinder, 56, through the duct, 82, the upper portion of the chamber, 80, and the port, 87, to the atmosphere. At the same time there is communication from the duct, 11, through the port, 77, to all of the space within the auxiliary cylinder below the piston, 58. And at the same time there is communication through the duct, 78, and the port, 79, into the upper portion of the auxiliary cylinder. And at the same time there is communication from the duct, 11, through the duct, 86, into the lower portion of the chamber, 80. And the main valve, 6, is closed, so that the fluid cannot pass from the chamber, 5, into the duct, 11, but the exhaust port, 15, is open and affords another outlet from the passage, 11.

Thus both the main-valve, 6, and the auxiliary slide valve, 65, are closed to prevent the passing of air from the chamber, 5, into the upper portion of the main cylinder for driving the main piston downward; the unseating of the auxiliary valve depending upon the previous movement of the main valve.

When the main valve is raised by the upward movement of the valve-bar, 46, the stem, 12, of the main valve covers the exhaust port, 15, and air moves through the duct, 11, and from the latter in three directions, namely; (1) through the port, 77, into the portion of the auxiliary cylinder below the piston, 58; (2) through the duct, 78, and the port, 79, into the portion of the cylinder above said piston; and (3) through the duct, 86, into the lower portion of the chamber, 82.

The pressure in the lower portion of the valve chamber, 80, drives the piston, 84, upward against the resistance of the spring, 85, and seats the valve, 83, so that air can no longer pass outward through the duct, 82. This movement of the piston, 84, occurs during a portion of the upward movement of the piston, 58. Since the port, 77, is larger than the port, 79, air rushes into the space below the piston, 58, faster than into the space above the piston, and there is an excess of upward pressure over the downward pressure sufficient to overcome the downward pressure of the spring, 61, and the weight and friction of the parts, so that said piston and the slide-valve, 65, are moved upward into the position shown in Fig. 10, the duct, 71, being uncovered and the duct, 72, being covered, so that there is no escape for the air from the lower portion of the auxiliary cylinder excepting around the body of the slide-valve and downward through the duct, 71, into the upper portion of the main cylinder. Thus the main piston is driven downward. But after a short interval, a sufficient amount of air has gone through the small port, 79, to equalize air density above and below the piston, 58. Then the downward force exerted by the spring, 61, and the weight of the parts moves the piston downward until the stop, 76, engages the upper face of the slide-valve and moves said valve downward into its lower or rest position. This again cuts off flow through the duct, 71, and again establishes flow through the duct, 72, the recess, 74, and the exhaust duct or port, 73, to the atmosphere. Pressure being thus taken from the upper or major side of the main piston, air pressing on the lower or minor side of said piston through the valve, 27, (Fig. 3) which was opened, as above described, through the action of the cam, 28, during the downward movement of the main piston, the main piston is driven upward.

Air pressure at each side of the piston, 58, and in the lower portion of the chamber, 80, continues if the main valve is still raised or open. When the main valve descends to its seat, flow of air from the chamber, 5, into the duct, 11, is cut off, and the exhaust port, 15, is uncovered by the stem, 12, so that the duct, 11, may exhaust through said port. This relieves pressure at both ends of the auxiliary cylinder and in the lower portion of the valve chamber, 80. As soon as this occurs, the spring, 85, again drives the piston, 84, and the valve, 83, downward so as to again permit communication between the upper portion of the auxiliary cylinder and the atmosphere through the duct, 82, the upper portion of the chamber, 80, and the port, 87.

If the fireman releases the pedal before the slide-valve descends, the main valve returns to its seat and the valve stem moves downward and uncovers the exhaust port, 15. Then air can no longer pass through the chamber, 5, from the port, 10, and air may escape from the upper portion of the interior of the main cylinder through the passage 71, chamber, 62, cylinder, 56, and from the valve chamber, 80, into and through the passage, 11, and the port, 15, and thence outward through the passage, 13, and port, 16, into the atmosphere. As soon as the cylinder, 58, and the slide-valve, 65, descend so that the latter covers the port or passage, 71, exhaustion from the cylinder, 56, and the chamber, 80, through the passage, 11, and port, 15 continues until atmospheric density has been established with said cylinder and said chamber. Following the closing of the port or passage, 71, the port or passage, 72, is put into communication with the exhaust duct or port, 73, through the recess, 74, in the slide-valve. As already stated, as soon as pressure is sufficiently reduced in the valve chamber, 80, the piston, 84, and the valve, 83, are driven downward by the spring, 85, so that there may be a rapid exhaust from the upper portion of the cylinder, 56, through the ports, 82 and 87.

Thus it will be seen that provision is made for exhausting to the atmosphere through three ports during each cycle of the operation, if the main valve closes before the slide-valve covers the port, 71, and through two ports if the main valve closes after the slide-valve covers the port, 71.

The function of the piston, 84, and the valve, 83, carried by said piston is to provide quick exhaust from the portion of the auxiliary cylinder above the piston, 58. Such exhaustion might take place through the port, 77, the ducts, 78, and 11, and the exhaust port, 15. But quick exhaustion is desirable in order that atmospheric pressure may be established before the fireman again presses the pedal for again opening the fire-box door.

The piston, 84, cannot be pushed downward by the spring, 85, until exhausting has begun through the duct, 11, and the exhaust port, 15.

The various parts and the ports, 77 and 79, are to be so proportioned and positioned as to cause the piston, 58, and the slide-valve, 65, to remain in the elevated or non-rest position during such length of time as will cause the fire-box door to open and remain open during the desired period of time, assuming that the fireman keeps the pedal depressed so long as to keep the main valve open during a period of time which would cause the fire-box door to be kept open longer than the desired time. If the fireman should release the pedal before the automatic closing of the slide-valve, then, as already described, the main valve would close and cut off the passage of air through the duct, 11 and exhaust said duct through the port, 15, and thereby promptly reduce air pressure at both sides of the piston, 58, and allow the spring, 61, to drive the auxiliary piston and the slide-valve into their rest positions.

Thus it will be seen that the operator cannot keep the fire-box door open longer than the time arbitrarily fixed for the action of the mechanism in the auxiliary cylinder. Theoretically, the fireman may open the door for a period shorter than the period for which the mechanism of the auxiliary cylinder is arranged; but it is advisable to arrange such automatic mechanism with reference to as short a period as will permit the insertion and withdrawal of a shovel for the delivery of coal through the door. Hence it may be assumed that in practice the fireman will keep the pedal depressed until the auxiliary piston and the slide-valve have moved and cut off the flow of air into the main cylinder, thus making uniform intervals during which the fire-box door is open.

Thus the apparatus comprises a main expansion chamber, a passage leading from a source of fluid under pressure, into the main expansion chamber, a main valve on said passage, and an auxiliary valve between said main valve and the main expansion chamber, the auxiliary valve being adapted to close said passage at the expiration of a chosen time following the opening of the main valve.

Fig. 15 shows another form of the main expansion chamber. The head, 4, is concave on its inner side. The stem, 88, is slidable endwise in bearings, 89 and 90, and is axially in alinement with the concave portion of the head. Adjacent the head, 4, the stem, 88, bears a head, 91. Between said head and the head, 4, is a flexible diaphragm, 92, having its edges extending outward beyond the concave portion of the head, 4, and between a ring, 93, and the adjacent face of the head, 4. Bolts, 94, extend through said ring and engage said head, whereby the edge of said diaphragm is sealed against the passage of air.

An expanding coiled spring, 95, surrounds the stem, 88, between the guide, 89, and the head, 91, and serves as a constantly-acting means tending to move the head, 91, and the stem, 88, toward the diaphragm, 92, and the head, 4.

The main valve chamber, 5, already described, is formed on the head, 4, and associated with said chamber are the valve, 6, seat, 7, cap, 8, spring, 9, stem, 12, passage, 13, and exhaust port, 16. And the port, 11, leads from the upper portion of the passage, 13, through the head, 4, into the cylinder, 56, as in Fig. 1. The other parts of the head, 4, are the same as in Fig. 1.

A pipe, 97, leading from a constant source of fluid under pressure is tapped into the wall of the valve chamber, 5, and a duct or port, 98, leads from said pipe into said chamber.

When the bar, 46, is pushed upward and raises the stem, 12, and the valve, 6, said stem covers the port, 16, and air flows from the pipe, 97, through the port, 98, and the chamber, 5, into the upper portion of the passage, 13, and through the port, 11, into and through the head, 4, by way of the passage, 71 into the space between said head and the diaphragm, 92. The air presses the diaphragm against the head, 91, and thereby presses said head and the stem, 88, away from the head, 4, the chamber formed by the head, 4, and the chamber being made larger and larger.

I claim as my invention,

1. In an apparatus of the nature described, the combination of a main expansion chamber and means associated with said chamber for performing work, means forming a passage from a source of fluid under pressure to said expansion chamber, a main valve on said passage, an auxiliary valve on said passage, and automatic means for closing the auxiliary valve at the expiration of a chosen time after the opening of the main valve, substantially as described.

2. In an apparatus of the nature described, the combination of a main expansion chamber and means associated with said chamber for performing work, means forming a passage from a source of fluid under pressure into the main expansion chamber, a main valve on said passage, an auxiliary valve on said passage between the main expansion chamber and the main valve, and automatic means for closing the auxiliary valve at the expiration of a chosen time after the opening of the main valve, substantially as described.

3. In an apparatus of the nature described, the combination of a main expansion chamber and means associated with said chamber for performing work, means forming a passage from a source of fluid under pressure into said main expansion chamber, a main valve on said passage, an auxiliary valve on said passage, an auxiliary expansion chamber for automatically closing said auxiliary valve at the expiration of a chosen time after the opening of the main valve, substantially as described.

4. In an apparatus of the nature described, the combination of a main expansion chamber and means associated with said chamber for performing work, means forming a passage from a source of fluid under pressure into said main expansion chamber, a main valve on said passage, an auxiliary valve on said passage between said main expansion chamber and the main valve, and an auxiliary expansion chamber for automatically closing said auxiliary valve at the expiration of a chosen time after the opening of the main valve, substantially as described.

5. In an apparatus of the nature described, the combination of a main expansion chamber and means associated with said chamber for performing work, means forming a passage from a source of fluid under pressure into said main expansion chamber, a main valve on said passage, a normally closed auxiliary valve on said passage between said main expansion chamber and the main valve, an auxiliary expansion chamber on said passage for automatically closing said auxiliary valve at the expiration of a chosen time after the opening of the main valve, substantially as described.

6. In an apparatus of the nature described, the combination of a main expansion chamber and means associated with said chamber for performing work, means forming a passage from a source of fluid under pressure into the main expansion chamber, a main valve on said passage, an auxiliary valve on said passage between the main expansion chamber and the main valve, and an auxiliary expansion chamber on said passage for automatically closing the auxiliary valve at the expiration of a chosen time after the opening of the main valve, substantially as described.

7. In an apparatus of the nature described, the combination of a main expansion chamber comprising a head and means associated with said chamber for performing work, means including said head forming a passage from a source of fluid under pressure to said expansion chamber, a main valve on said passage, an auxiliary valve on said passage, and automatic means for closing the auxiliary valve at the expiration of a chosen time after the opening of the main valve, substantially as described.

8. In an apparatus of the nature described, the combination of a main expansion chamber comprising a head and means associated with said chamber for performing work, means including said head forming a passage from a source of fluid under pressure into the main expansion chamber, a main valve on said passage, an auxiliary valve on said passage between the main expansion chamber and the main valve, and automatic means for closing the auxiliary valve at the expiration of a chosen time after the opening of the main valve, substantially as described.

9. In an apparatus of the nature described, the combination of a main expansion chamber comprising a head and means associated with said chamber for performing work, means including said head forming a passage from a source of fluid under pressure into said main expansion chamber, a main valve on said passage, an auxiliary valve on said passage, an auxiliary expansion chamber for automatically closing said auxiliary valve at the expiration of a chosen time after the opening of the main valve, substantially as described.

10. In an apparatus of the nature described, the combination of a main expansion chamber comprising a head and means associated with said chamber for performing work, means including said head forming a passage from a source of fluid under pressure into said main expansion chamber, a main valve on said passage, an auxiliary valve on said passage between said main expansion chamber and the main valve, and an auxiliary expansion chamber for automatically closing said auxiliary valve at the expiration of a chosen time after the opening of the main valve, substantially as described.

11. In an apparatus of the nature described, the combination of a main expansion chamber comprising a head and means associated with said chamber for performing work, means including said head forming a passage from a source of fluid under pressure into said main expansion chamber, a main valve on said passage, a normally closed auxiliary valve on said passage between said main expansion chamber and the main valve, an auxiliary expansion chamber on said passage for automatically closing said auxiliary valve at the expiration of a chosen time after the opening of the main valve, substantially as described.

12. The combination of a fluid pressure motor having a member for performing work, a main valve controlled by the operator for controlling admission of fluid to the motor for operating the latter, an auxiliary expansion chamber communicating with the motor and an auxiliary valve operated by the pressure of said auxiliary expansion chamber to automatically cut off the admission of fluid to the motor at a predetermined time after the opening of the main valve, substantially as described.

In testimony whereof I have signed my name this 28th day of April, in the year one thousand nine hundred and fifteen.

GEORGE AKANS.